United States Patent [19]

Ross

[11] Patent Number: 4,497,545
[45] Date of Patent: Feb. 5, 1985

[54] METHOD AND DEVICE FOR INCREASING THE DENSITY OF A PLURALITY OF SWITCHABLE MAGNETIC ELEMENTS

[75] Inventor: William E. Ross, Woodland Hills, Calif.

[73] Assignee: Litton Systems, Inc., Beverly Hills, Calif.

[21] Appl. No.: 375,327

[22] Filed: May 5, 1982

[51] Int. Cl.³ ............................................. G02F 1/09
[52] U.S. Cl. ....................................... 350/376; 365/2
[58] Field of Search ............... 350/376, 375, 377, 378; 204/192 M; 365/2, 35, 37; 360/114

[56] References Cited

U.S. PATENT DOCUMENTS 3,723,985  3/1973  Krupp et al. ............................ 365/2
4,012,724  3/1977  Hanson et al. .......................... 365/2

Primary Examiner—Bruce Y. Arnold
Assistant Examiner—William Propp

[57] ABSTRACT

An improved grid pattern is shown for increasing the density of magnetic post elements, within a magneto-optic display, for example, wherein the post elements are separated by a grid-like pattern of spaces which are filled with conductive elements arranged generally in the X and Y directions. Each quadrilaterally shaped post element is separated by a diagonal so that the first, third, fifth ... etc. columns of post elements have diagonals running in one direction while the second, fourth, sixth ... etc. columns have diagonals running in the opposite direction. A region of low anisotropy material is located in the corner of each triangularly shaped magnetic post element opposite the diagonal which forms the triangular element so as to be as close as possible to all extremes of the element.

13 Claims, 5 Drawing Figures

METHOD AND DEVICE FOR INCREASING THE DENSITY OF A PLURALITY OF SWITCHABLE MAGNETIC ELEMENTS

FIELD OF THE INVENTION

The present invention relates to a method and device for increasing the density of a plurality of switchable magnetic elements and, more particularly, to an improved pattern which separates the magnetic post elements upon a nonmagnetic substrate to permit a higher density of magnetic post elements, a reduced number of electrical conductors required to switch the magnetic post elements, or a pattern of post elements having an area of low anisotropy as close to all extremes of the magnetic post elements as possible.

BACKGROUND OF THE INVENTION

It is well known that the direction of magnetization of a magnetic material can be reversed or switched by impressing an external magnetic field of opposite polarity upon the material. Typically, magnetic material may be placed upon a nonmagnetic substrate and then divided or separated by a grid-like pattern to create magnetic post elements. When electric conductors are placed within the separations which form the grid-like pattern, electric currents may be passed through the conductors to generate a magnetic flux about each conductor. This flux is concentrated at the intersection of two conductors in two of the four quadrants formed by the intersection. Through the utilization of a low anisotropy material located within one of the two quadrants in which the flux is concentrated, it is possible to control which magnetic post element will be switched at each intersection.

The technique of utilizing a grid-like pattern to switch the direction of mangetization of a magnetic element is known in bubble domain structures, see for example, U.S. Pat. No. 4,114,191, issued Sept. 12, 1978, by R. E. Lund, entitlted "Bubble Domain Structuring In Bubble Domain Memory Plane." It is also known to utilize a grid-like pattern formed upon a transparent nonmagnetic substrate by separations of a transparent magnetic coating to form a magneto-optic device; see example, British Pat. No. 1,180,334, published Feb. 4, 1970, by R. F. Pearson, et al., entitled "Optical Scanner."

The concept of placing a low anisotropy material within the high anisotropy material of a magnetic post element has been disclosed in a co-pending U.S. patent application, Ser. No. 320,819, filed Nov. 12, 1981, by Bruce E. MacNeal and William E. Ross, entitled "Altering The Switching Threshold Of A Magnetic Material," assigned to the same assignee as the present invention. In yet another co-pending application the concept of reducing the number of electrical conductors required to switch the direction of magnetization of magnetic post elements has been discussed. See, co-pending U.S. patent application Ser. No. 375,326, filed May 5, 1982, by Bruce E. MacNeal, entitled "Method And Device For Improving A Conductive Switching Grid For Magnetic Elements."

The MacNeal patent application teaches a method and device for eliminating every other electrical connector in either the X or Y direction of the grid-like pattern formed by separations between the magnetic post elements. However, this arrangement does not permit the elimination or reduction of conductors in both the X and Y directions.

SUMMARY OF THE INVENTION

Accordingly, it is an object of the present invention to reduce the required number of electrical conductors in both the X and Y directions between a plurality of switchable magnetic elements.

Another object of the present invention is to increase the density of the magnetic post elements within a given matrix.

A further object is to create a pattern of magnetic post elements and conductors in which a small area of low anisotropic material may be placed as close as possible to the conductors and the extremes of the high anisotropy material which forms the magnetic posts.

In accomplishing these and other objects, there is provided a transparent, nonmagnetic substrate upon which is placed a layer of transparent, magnetic material having a high anisotropy. The high anisotropy material is divided by a grid-like pattern of separations in the X and Y directions to form quadrilaterally shaped magnetic post elements arranged in horizontal rows and vertical columns. Electrically conductive elements are then deposited within the separations in the X and Y directions. Each post element in every other column is further separated along one diagonal to form alternate columns of quadrilateral post elements having trangularly shaped subelements with diagonals running in the same direction. The post elements in every other alternate column are next separated along the second diagonal. A small region of low anisotropy material is then placed in the surface of each triangular magnetic post, element closest to the intersection of the conductors and opposite the diagonal that forms each post element.

This arrangement permits twice the density of magnetic post elements within a given grid pattern of electrical conductors. If one wished to use a triangular magnetic post element with the same area as a prior quadrilateral post element, the resolution of a quadrilateral element matrix may be retained while spreading the distance of separation between conductors in the X and Y directions of a triangular matrix by a factor of $\sqrt{2}$.

DESCRIPTION OF THE DRAWINGS

A better understanding of the objects and advantages of the present invention may be had after consideration of the following specification and drawings, in which.

DESCRIPTION OF THE PREFERRED EMBODIMENTS

Figure 1:
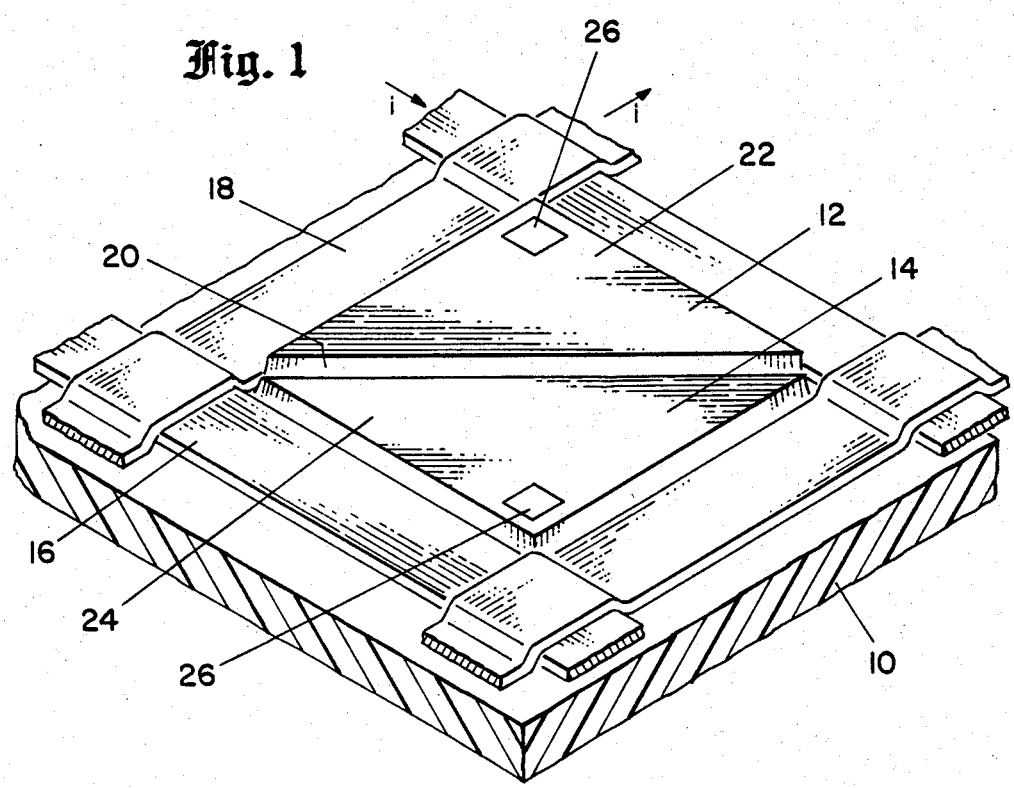
FIG. 1 is a perspective view showing a nonmagnetic substrate, magnetic post elements, and electrical conductors utilizing the arrangement of the present invention.

Referring now to the drawings, FIG. 1 shows a nonmagnetic and optically transparent substance 10, which may be formed from a garnet material, such as gadolinium gallium garnet (GGG). Deposited upon the substrate 10 is a layer of transparent magnetic film material 12, which may be deposited by the liquid phase epitaxy method and which may be one of several transparent films that demonstrate magnetic domain characteristics. Such films may be created from iron garnet by substituting bismuth and certain rare earth elements into the iron garnet. The magnetic film 12 must be transparent to electromagnetic energy; however, the nonmagnetic substrate 10 may be opaque when used in a reflective mode.

The magnetic film 12 may be grown in a pattern of separations or deposited across the full surface of substrate 10 and then separated into a grid-like pattern by its removal from the substrate 10 by various methods including chemical etching or ion beam milling. Alternately, the separations may be accomplished by ion beam implantation to render the film 12 nonmagnetic without actually removing any of the film material. The patterns established by the removal of the film may be varied. In the preferred embodiment, however, the pattern is an orthogonal, grate-like pattern which separates the film 12 into a plurality of magnetic post elements 14 in the form of a quadrilateral or square.

Figure 4:
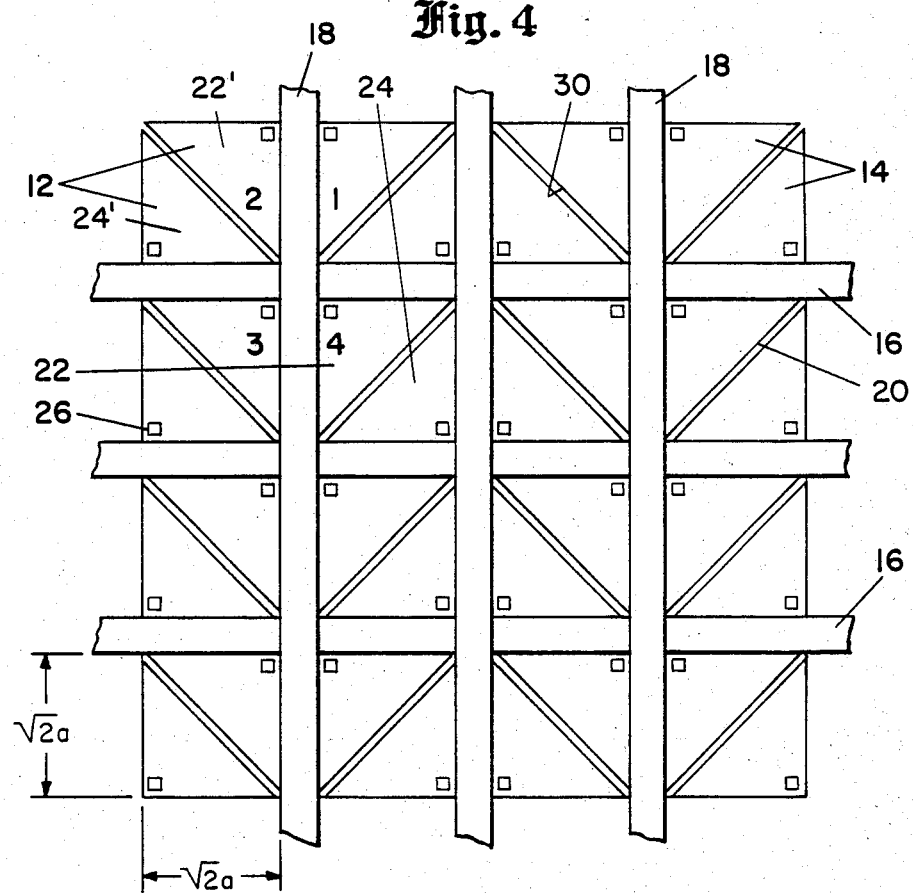
FIG. 4 is a schematic diagram showing triangularly shaped magnetic post elements having a side length of "$\sqrt{2}a$" which form the a grid-like pattern of the present invention.

It will be seen that the orthogonal pattern includes a first set of separations, FIG. 4, running in the Y direction or vertically down the face of the substrate 10, and a second set of separations running in the X direction or horizontally across the substrate. Placed within these separations, as by metal depositing, are a plurality of electrical conductors 16 which are deposited in the X direction. Next, a thin layer of a suitable insulation material is deposited over the conductors 16, especially in the areas where they will intersect with conductors deposited within the vertical separations. Electrical conductors 18 are then deposited in the vertical separations between the quadrilateral or square post elements 14. In the preferred embodiment, conductors 16 and 18 may be deposited up the sides of post elements 14 and over the peripheral surface thereof for a short distance. Conductors 16 and 18 could be deposited upon a second substrate of transparent, nonmagnetic material and then aligned with the separations in another embodiment of the present invention.

The quadrilateral or square post elements 14 are then separated along one of their two diagonals as best seen in FIGS. 1 and 4. In practice, the diagonal separation actually takes place along with the X and Y separations as part of the same etching process. In FIG. 1, the diagonal has a positive slope if one considers the lower left-hand corner as being the zero point of the X and Y axes formed by the conductors 16 and 18, respectively. This positively sloped separation is shown in FIG. 1 at 20 dividing the quadrilateral post element 14 into triangularly shaped subelements 22 and 24. In the upper left-hand corner of triangular post element 22 a first region of low anisotropy material 26 has been formed, as by ion-implantation or laser annealing, in the surface of the high anisotropy material 12.

As taught by the co-pending U.S. patent application Ser. No. 360,810, now U.S. Pat. No. 4,439,809, filed Nov. 12, 1981, the exposure of the first region 26 to a flux field causes the direction of magnetization within the first region to change or rotate 180° thereby creating a domain wall. This domain wall, not shown, will continue to spread under the influence of the flux field until it reaches the interface between the first region 26 and the magnetic film 12 in triangularly shaped post element 22. At this interface, the reversed direction of magnetization is sufficiently strong enough to reverse the magnetization of the high anisotropy material in the film 12. The reversal then moves across the magnetic film 12 within the triangular element 22 by domain wall motion until a full reversal of the magnetic direction has been accomplished. It has been found that the further the reversal of magnetization gets from the first region 26 the more magnetic field, and the more current, is required to complete the reversal. Thus, it is desired to locate the region 26 of low anisotropy material as close to the extremes of the high anisotropy film material 12 as possible.

Figure 2A:
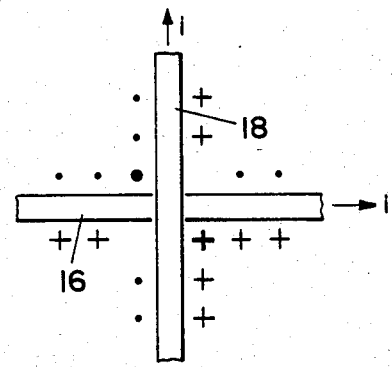
FIGS. 2a and 2b are schematic diagrams illustrating the magnetic flux about a pair of intersecting conductors.

A flux field sufficiently strong enough to change the direction of magnetization of the first region 26 is generated by the crossing of the horizontal conductor 16 and vertical conductor 18. If a current is passed through these conductors in a positive direction, as shown in FIGS. 1 and 2a, the flux from conductor 18 will be directed away from the reader on the right-hand side of the conductor while it is directed toward the reader on the left-hand side. Similarly, the flux in conductor 16 is directed away from the reader on the lower surface while being directed toward the reader on the upper surface. As seen in FIG. 2a, the combined flux caused by the crossing wires cancels in the first and third quadrant formed by the intersection of the conductors 16 and 18; while it adds in the second and fourth quadrant. As the first region 26 is located in the fourth quadrant of the intersecting wires 16 and 18, FIG. 1, there is a sufficient flux field to reverse the direction of magnetization within that region. As seen in FIG. 4, where the quadrants have been numbered 1-4 in the upper left-hand corner, the triangular post element 22 in the second row, second column will undergo a change in its direction of magnetization.

If polarized light is being passed through the transparent substrate 10 and transparent film 12, and then through an analyzer, not shown, the viewer will perceive a change in a color of post element 22 since the Faraday effect of the material 12 will cause the rotation of polarized light which is then blocked by the analyzer, not shown.

Alternately, polarized light may be directed toward the substrate 10, through the transparent film 12 and reflected from a reflective surface, such as a silver or gold plated surface. The light is then reflected and passed a second time through the film 12 toward an analyzer and the viewer. The substrate 10 may or may not be transparent. Unlike liquid crystal displays, polarized light passing through the magnetic film 12 is rotated as it enters the film 12 due to the Faraday effect and continues to rotate as it is reflected back through the film. Thus, a thin film 12 will rotate reflected polarized light two times more than light passing through a transparent film.

Figure 2B:
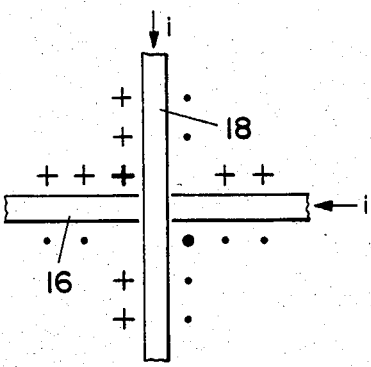

As seen in FIG. 4, the concentration of flux in a direction toward the reader in the second quadrant of the intersection of the conductors 16 and 18 having a current "i" flowing in the directions shown will have no effect on the triangular shaped post elements 22' and 24' in the upper left-hand corner as there is no first region 26 to be affected in that second quadrant. If one wished to return triangular post element 22 to its original state, one would simply reverse the current within conductors 16 and 18, as shown in FIG. 2b, to produce an increased flux in the fourth quadrant in a direction toward the reader. This reversed flux will first reverse the direction of magnetization in region 26 and then, by domain wall motion, reverse the direction of magnetization in the film 12 which comprises a majority of triangular post element 22, as described above. It will now be seen that by permitting conductors 16 and 18 to overlay the edge periphery of the surface of magnetic post 14 which forms the triangular elements 22 and 24, the conductors are placed as close as possible to the first region of low aniosotropy material 26. In some embodiments, contact between the conductors 16 and 18 and the low anisotropy regions 26 is desirable. Further, the triangular shape of post elements 22 and 24 permit the first region 26 to be located as close as possible to the furthermost extreme of the magnetic film 12 which forms the elements 22 and 24.

As best seen in FIG. 4, a plurality of triangular post elements 22 and 24 are formed by diagonal separations which have positive slopes 20 and negative slopes 30. It will be noted that the post elements 14 are separated by positively sloped diagonals 20 in alternate columns, in this example the second and fourth column; while the post elements 14 in the first and third columns have been separated by diagonals 30 having a negative slope.

The reason for alternating between positive and negatively sloped diagonals in the second and fourth row versus the first and third row, FIG. 4, is to prevent a current passing through the conductors 16 and 18 from detrimentally affecting the direction of magnetization of a triangular element in a quadrant adjacent to the element being switched. For example, assume it's desired to reverse the direction of magnetization of the post element 22 in the second row, second column by producing a flux passing away from the reader in the upper left-hand corner of that triangular element, labeled quadrant 4. Current passing through the uppermost horizontal conductor 16 from left to right and through the left-hand vertical conductor 18 from bottom to top would produce a flux large enough to affect a triangular post element if its first region 26 were located in the second and fourth quadrants of the intersection of the two conductors thus described. By reversing the slope of the diagonal separation of post element 14 in the first row, first column to form two triangular shaped post elements 22' and 24' which have little high anisotropy material in the quadrant labeled 2 and no first region of low anistropy material 26, it will be seen that there is no magnetic material in the quadrant 2 which can be affected by a reversed flux. Thus, it is apparent that the herringbone like pattern created by the positively and negatively sloped diagonals is necessary to prevent undesirable switching of magnetic post elements.

Figure 3:
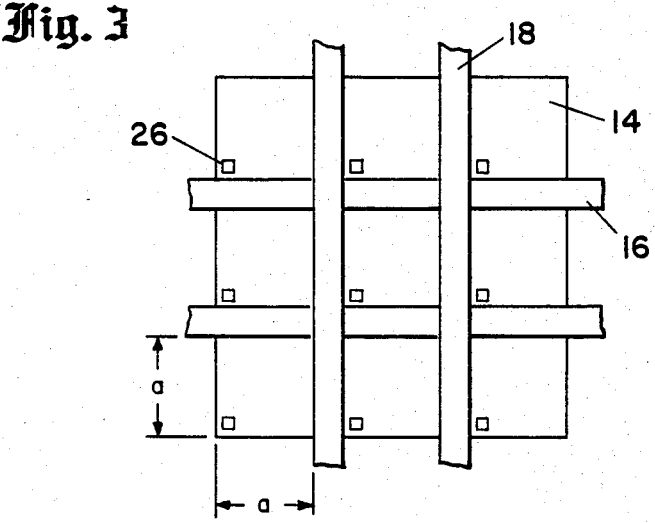
FIG. 3 is a schematic diagram illustrating quadrilaterally shaped magnetic post elements having a side length of "a" defined by an orthogonal grid-like pattern over which the present invention is an improvement.

Referring now to FIG. 3, one advantage of the present invention will be described over the prior art. FIG. 3 shows a matrix incorporating magnetic post elements 14 separated by horizontal and vertical conductors 16 and 18, respectively, as taught by the co-pending U.S. application Ser. No. 320,819. The first regions of low anisotropy material 26 compared to the high anisotropy material of post elements 14 are each located in the lower left-hand corner of the post elements 14. FIG. 3 has been drawn to scale when compared to FIG. 4. A typical post element 14 is identified as having a side length "a" and is shown as square shaped; alternately, its shape could also be a quadrilateral. As seen in FIG. 4, the area of the square post element 14 of FIG. 3 is equalled by a triangular area of the post element 22 if the side length of that element is "$\sqrt{2} \times a$."

As seen in FIG. 4, the distance from each corner where the region of low anisotropy material 26 is implanted to the diagonals 20 or 30 along a line perpendicular to these diagonals is "a." That distance is shorter by a factor of 0.7 in FIG. 4 than the distance between diagonal corners in FIG. 3. Remember, to complete the magnetic switching of the magnetic film 14 at the farthest point from the conductors 16 and 18 and region 26, the magnetic field must exceed the saturation field $H_{sat}$ of the film. In FIG. 3, the extreme point, which is the critical point, is diagonal corner at a distance of "$\sqrt{2}a$." In FIG. 4, the extreme or critical point is at the distance "a" from the region 26 on a line perpendicular to diagonal 20 or 30. Along the edge of the triangular elements 22 and 24, the conductors 16 and 18 supply a flux which assists in switching the corners of the triangles by adding to the flux generated at the conductor intersection. Such assistance is not found in FIG. 3.

The configuration of FIG. 4 therefore has an additional advantage in that the current required to complete the switching of the triangular elements 22 and 24 is only 0.7 of that required to switch the square elements 14, FIG. 3. This permits the size of the triangular elements 22 and 24 to be further increased to twice the area size shown in FIG. 3 for the same drive current required to complete the switching of the square elements 14 in FIG. 3. The conductors may therefore be placed twice as far apart for reducing the number of conductors by a factor of 2 in each direction or reducing the total number of conductors by a factor 4. Clearly, this configuration will reduce the number of conductors, the number of connectors, the complexity of the sequential switching and the amount of current needed to operate a magneto-optic device which may be created from the matrix shown in FIG. 4.

If one wished to increase the density of the matrix shown in FIG. 3 to include twice as many post elements, it is clear that this may be accomplished by dividing the square post elements 14 in the first and third columns with a positive or negative going diagonal while the post elements 14 in the second column are divided by negative or positive going diagonal. It will also be noted that the first regions 26 are much closer to the extreme or critical regions of the triangular post elements 22 and 24 in FIG. 4 than to extreme regions of square post elements 14 in FIG. 3.

The configuration of FIG. 4 also lends itself to the creation of a matrix which will produce five levels of gray scale. That is, triangular elements 22 and 24 may be magnetized to each produce a light appearance; one can be demagnetized (half light and half dark) while the other is light; both may be demagnetized, or one may be dark and one light; one can be demagnetized, while the other is dark; and both may be dark. This arrangement is further described in a copending U.S. patent application, Ser. No. 375,321 filed May 5, 1982, which is assigned to the same assignee as the present invention.

While the present invention has been described and illustrated to include an orthogonal grid pattern separating square post elements which are then divided into 45° right triangles, it will be understood that other configurations are possible within the teachings of the present invention. Further, the present invention may be used to reflect or transmit polarized light.

I claim:

1. A method for increasing the density of a plurality of switchable magnetic post elements formed from a magnetic material upon a nonmagnetic material, comprising the steps of:

placing a magnetic material having high anisotropy upon said nonmagnetic material to form separations in said magnetic material and thus form said post elements;

arranging said separations in a grid-like pattern having a first set of separations in a first direction and a second set of separations in a second direction to form said post elements into quadrilateral shapes;

arranging further separations in alternate rows of said post elements, between said separations in said first direction, in a third direction diagonally across said quadrilaterally shaped post elements to form triangularly shaped post elements;

placing a conductive material in alignment with each of said grid-like separations in said first and second directions;

arranging still further separations in the remaining rows of said post elements, between said separations in said first direction, in a fourth direction diagonally across said quadrilaterally shaped post elements to form additional triangularly shaped post elements; and placing a first region of material in said high anisotropy magnetic material which forms said post elements that has a low anisotropy relative to said high anisotropy of said magnetic post elements, said first region placed in a corner of each triangularly shaped post element opposite said diagonals in said third and fourth directions.

2. A method for increasing the density of a plurality of switchable magnetic post elements, as claimed in claim 1, wherein:

said step of arranging said separations in a grid-like pattern includes said separations in an orthogonal pattern with said first and second directions arranged as vertical and horizontal directions;

said step of arranging said further separations in alternate rows include arranging said separations in alternate vertical rows of quadrilateral post elements with said diagonal separations in said third direction having a negative slope; and said step of arranging said still further separations in alternate rows including arranging said separations in alternate vertical rows of quadrilateral post elements with said diagonal separations in said fourth direction having a positive slope.

3. A method for increasing the density of a plurality of switchable magnetic post elements, as claimed in claim 2, wherein said quadrilateral post elements are square elements.

4. A plurality of magnetic post elements formed from a magnetic material upon a nonmagnetic support material having grid-like separations between said post elements, comprising:

said magnetic material forming said magnetic post elements having a high anisotropy with magnetic domain characteristics;

said grid-like separations positioned between said magnetic post elements in a first and second direction to divide said magnetic post elements into quadrilateral shapes;

conductor means located within said separations in said first and second directions;

said grid-like separations also positioned diagonally across said quadrilaterally shaped magnetic post elements to divide each quadrilateral into two triangular post elements; and a first region of low anisotropy material compared to said high anisotropy material located within each corner of said triangular post elements opposite said diagonal separations.

5. A plurality of magnetic post elements as claimed in claim 4, wherein:

said magnetic post elements and said nonmagnetic support are formed from transparent materials and said magnetic post elements are magneto-optic post elements.

6. A plurality of magnetic post elements as claimed in claim 4, wherein:

said grid-like pattern is formed from orthogonal separations in a first vertical and second horizontal direction.

7. A plurality of magnetic post elements as claimed in claim 4, wherein:

said first and second separations divide said post elements into rows; and said separations positioned diagonally across said magnetic post elements are positioned in a third direction in alternate rows of said magnetic post elements and in a fourth direction in the remaining rows of said magnetic post elements.

8. A plurality of magnetic post elements as claimed in claim 7, wherein:

said grid-like separations are formed from orthogonal separations;

said quadrilaterally shaped magnetic post elements are square elements;

said first and second directions of separation are diagonal directions; and said third and fourth directions of separation are vertical and horizontal directions.

9. A magneto-optic device, comprising:

a transparent, nonmagnetic substrate;

a thin layer of transparent, magnetic material having high anisotropy with magnetic domain characteristics upon said substrate;

orthogonal separations within said magnetic material forming a grid-like pattern having first and second sets of separations which divide said magnetic material into rows of quadrilateral post elements;

conductors placed in said first and second set of separations;

said quadrilateral post elements in alternate rows separated along a first diagonal of said quadrilateral to form triangularly shaped post elements;

said quadrilateral post elements in the remaining rows separated along a second diagonal of said quadrilateral to form triangularly shaped post elements;

a first region of low anisotropy material when compared to said high anisotropy material located in each corner of each triangularly shaped post element opposite said diagonal separations juxtaposed to an intersection of said conductor; and means for passing polarized electromagnetic energy through said magnetic material.

10. A magneto-optic device, as claimed in claim 9, wherein said eletromagnetic energy is transmitted through said magneto-optic device.

11. A magneto-optic device, as claimed in claim 9, additionally comprising reflective means for reflecting said electromagnetic energy which passed through said magnetic material back through said magnetic material.

12. A magneto-optic device, as claimed in claim 9, wherein:
   said first and second sets of separations are vertical and horizontal, respectively;
   said quadrilateral post elements are square; and
   said first diagonals are substantially orthogonal to said second diagonals that form said triangular post elements.

13. A plurality of magnetic post elements formed from a magnetic material upon a nonmagnetic support material having grid-like separations between said post elements, comprising:
   said magnetic material forming said post elements having a high anisotropy with magnetic domain characteristics;
   said grid-like separations positioned between said post elements in a first and second direction to divide said post elements into quadrilateral shapes;
   each of said quadrilateral shapes further separated into triangular post elements by a diagonal separation;
   conductor means aligned with said grid-like separations in said first and second directions;
   a first region of low anisotropy material compared to said high anisotropy material located within said high anisotropy material of said post elements;
   said conductor means adjacent said first region of low anisotropy material; and
   said first region of low anisotropy material located closely to the extreme portions of said high anisotropy material opposite said diagonal separation.

* * * * *